United States Patent [19]

Elliot

[11] Patent Number: 5,170,825

[45] Date of Patent: Dec. 15, 1992

[54] BOOM SUPPORT FOR A DISC SAW FELLING HEAD

[75] Inventor: D. Bruce Elliot, Barrie, Canada

[73] Assignee: FMG Timberjack Inc., Canada

[21] Appl. No.: 755,635

[22] Filed: Sep. 5, 1991

[51] Int. Cl.$^5$ .............................................. A01G 23/08
[52] U.S. Cl. .................. 144/34 R; 30/379 S; 144/3 D; 144/336; 414/694
[58] Field of Search ............... 414/680, 685, 694; 144/2 Z, 3 D, 34 R, 34 E, 336, 337, 339; 83/698; 30/379 S

[56] References Cited

U.S. PATENT DOCUMENTS

| | | | |
|---|---|---|---|
| 3,720,245 | 3/1973 | Puna | 144/34 R |
| 3,738,401 | 6/1973 | Wiklund et al. | 144/34 R |
| 4,446,897 | 5/1984 | Kurelek | 144/34 R |
| 4,769,977 | 9/1988 | Milbourn | 144/34 R |

*Primary Examiner*—W. Donald Bray
*Attorney, Agent, or Firm*—Blake, Cassels & Graydon

[57] ABSTRACT

An articulated two-boom support for a disc saw felling head. A first of the booms is pivotally connected to a base of a logging vehicle. The second boom is pivotally connected to the first boom at a pivotal joint and the booms are further joined to each other by a knuckle joint located below the pivotal joint connecting the booms. The knuckle joint includes two links pivotally connected to each other. The link connected to the first boom is also connected to the base by a locking hydraulic cylinder. An actuating hydraulic cylinder is linked to the first boom and base so as to rotate the first boom about the axis of its pivotal connection to the base. The arrangement is such that the disc saw felling head, mounted at the free end of the second boom, moves in a direction suitable for cutting a tree as the actuating cylinder is extended. The height of the disc felling head may be adjusted by altering the extended length of the locking hydraulic cylinder.

11 Claims, 4 Drawing Sheets

BOOM SUPPORT FOR A DISC SAW FELLING HEAD

FIELD OF THE INVENTION

This invention relates to improvements in a boom support for a disc saw felling head of a logging vehicle such as a feller buncher. In particular, this invention provides an articulated two-boom support having its felling head mounted on a free end of one of the booms and which support moves the felling head along a tree trunk cutting path by operation of a single actuator connected to the other boom. The booms are connected by a two-member knuckle joint one member of which is connected by a stick to the vehicle.

BACKGROUND OF THE INVENTION

It is well known in the logging machinery industry to mount a disc saw felling head at the end of a two boom support in which two hydraulic cylinders connected to the booms are manually operated simultaneously to guide the head horizontally towards and through a tree trunk as it is being cut.

Recent improvements to this conventional approach include the development of a dual boom support having two hydraulic cylinders connected by a compensating slave cylinder arranged by directed flow between the two main cylinders to maintain a constant vertical position of a mounted felling head as the support booms move the head. Another approach involves the use of a dual boom support having a pair of hydraulic cylinders under computer control to maintain the vertical position of the felling head as its position is adjusted by an operator.

Both of these approaches improve the cutting operation in that an operator is not required to balance the motion of two booms. These approaches still require the operation of two hydraulic cylinders during the cutting operation, albeit not directly by the operator, and the second approach additionally requires the inclusion and maintenance of microelectronics in a relatively hostile environment.

A different approach, known to the inventor, used in connection with a buncher, involves inclusion of a pair of pivotal links connecting a pair of booms. One of the links is connected to a hydraulic cylinder which is fixed in position while the head of the buncher is being moved horizontally. This mechanical arrangement is described in more detail below, but it has the advantage that only one of a pair of hydraulic cylinders is generally required to be operated to move the head horizontally. The operation is thus relatively simple for the operator, and the operation of a single cylinder is more energy efficient. One problem with this known arrangement, as it might by applied to tree felling, is its arrangement of links and the fixed hydraulic cylinder connected above one of the booms. Such an arrangement in a tree feller has the disadvantage of exposing the links and locking cylinder to damage from falling tree trunks, branches, etc.

GENERAL DESCRIPTION OF THE INVENTION

The present invention provides an improved tree feller support which requires the operation of only one hydraulic cylinder to move a disc saw felling head along a tree trunk cutting path during operation. There is a pair of pivotally connected booms, a first of which booms is pivotally mounted to a logging vehicle and the other of which has the felling head mounted at one end. There is a knuckle joint including a pair of links which connects the pair of booms, the links being located on the underside of the booms. There is a locking cylinder or the like pivotally mounted between one of the links and the base on which the support is mounted located under the first boom. The arrangement is such that downward rotation of the boom mounted to the vehicle causes the head to move outwardly along a tree trunk cutting path. Further, the arrangement permits the inclusion of a hoist cylinder to drive rotation of the first boom. This cylinder is located in a position less vulnerable to damage by falling tree limbs etc.

DETAILED DESCRIPTION OF A PREFERRED EMBODIMENT

Figure 1:
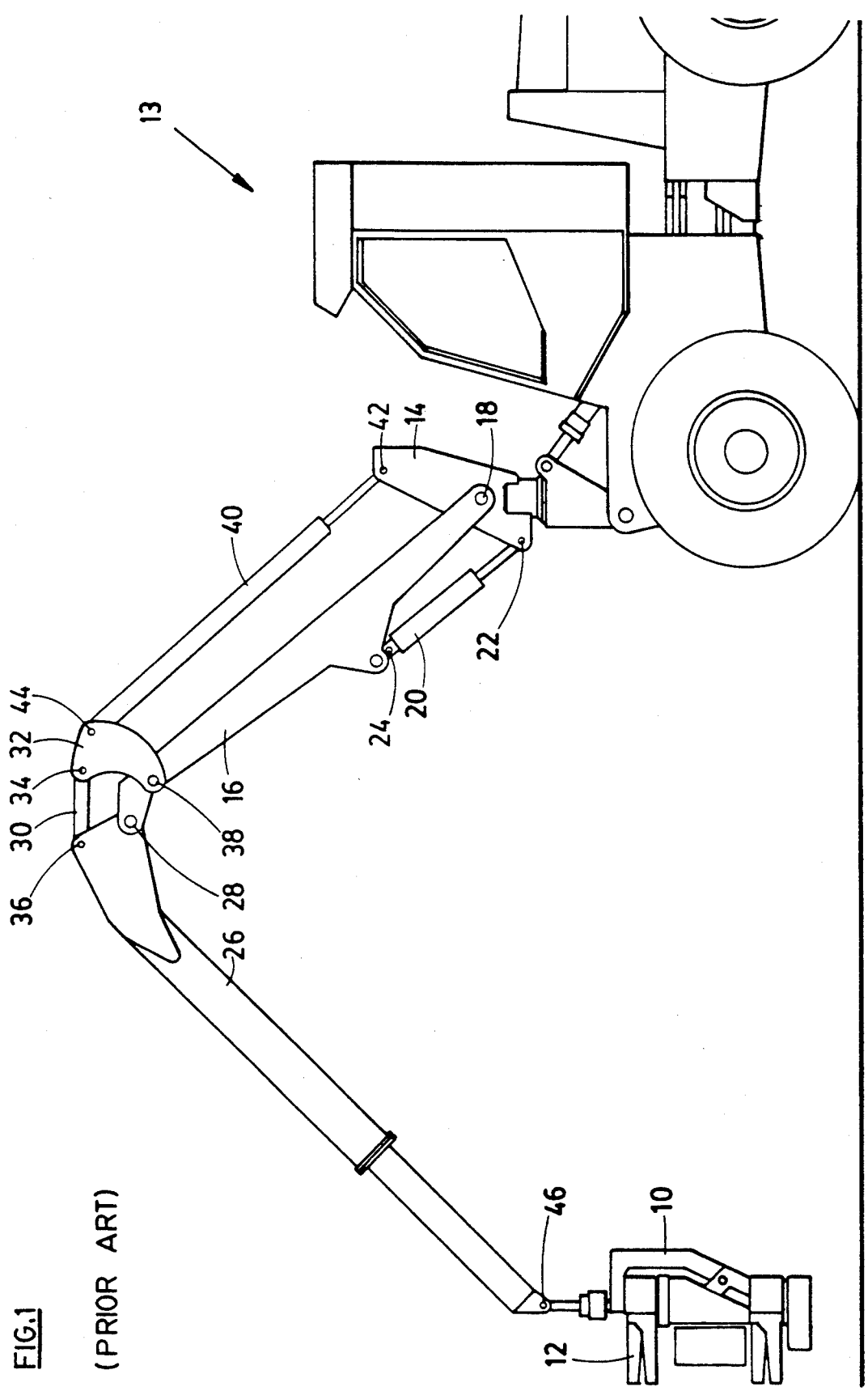
FIG. 1 illustrates a known articulated boom arrangement which may be operator-controlled by a single double-acting hydraulic cylinder.

Turning now to FIG. 1, a known boom configuration for a felling head 10 having bunching arms 12 is shown. Mobile carriage 12 has base 14 to support boom 16 at pivotal connection 18 while hoist cylinder 20 is pivotally connected to the base and boom at connections 22, 24. Extension of double-acting cylinder 20 causes rotation of boom 16 in a clockwise direction as shown in FIG. 1, while contraction of the cylinder causes counter-clockwise rotation of the boom. Boom 26 is pivotally connected to boom 16 at connection 28. Links 30, 32, connected to each other at pivotal connection 34, are connected to the booms at pivotal connections 36, 38. Rotational movement of boom 26 about the axis of pivot joint 28 is thus coupled with movement of links 30, 32. Hydraulic cylinder 40 is pivotally connected between base 14 and link 32 at connections 42, 44. In use, when cylinder 40 is locked in position and hoist cylinder 20 is actuated to rotate boom 16 about connection 18, generally horizontal movement of tip 46 of boom 26 occurs, by virtue of the synchronous movement of the booms and links as effected by the fixed length of cylinder 40.

Figure 2:
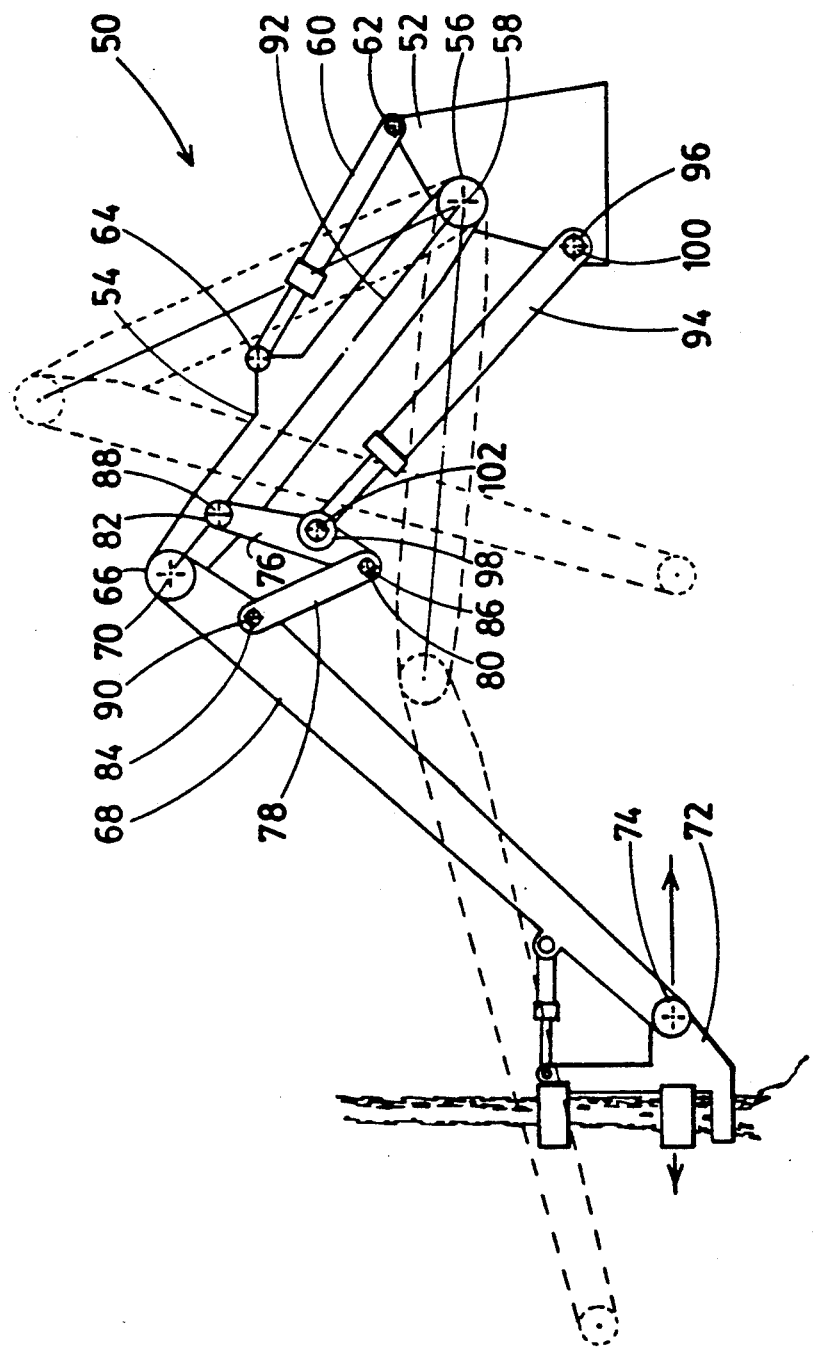
FIG. 2 is a side view in elevation of the preferred embodiment support of the present invention.
Figure 3:
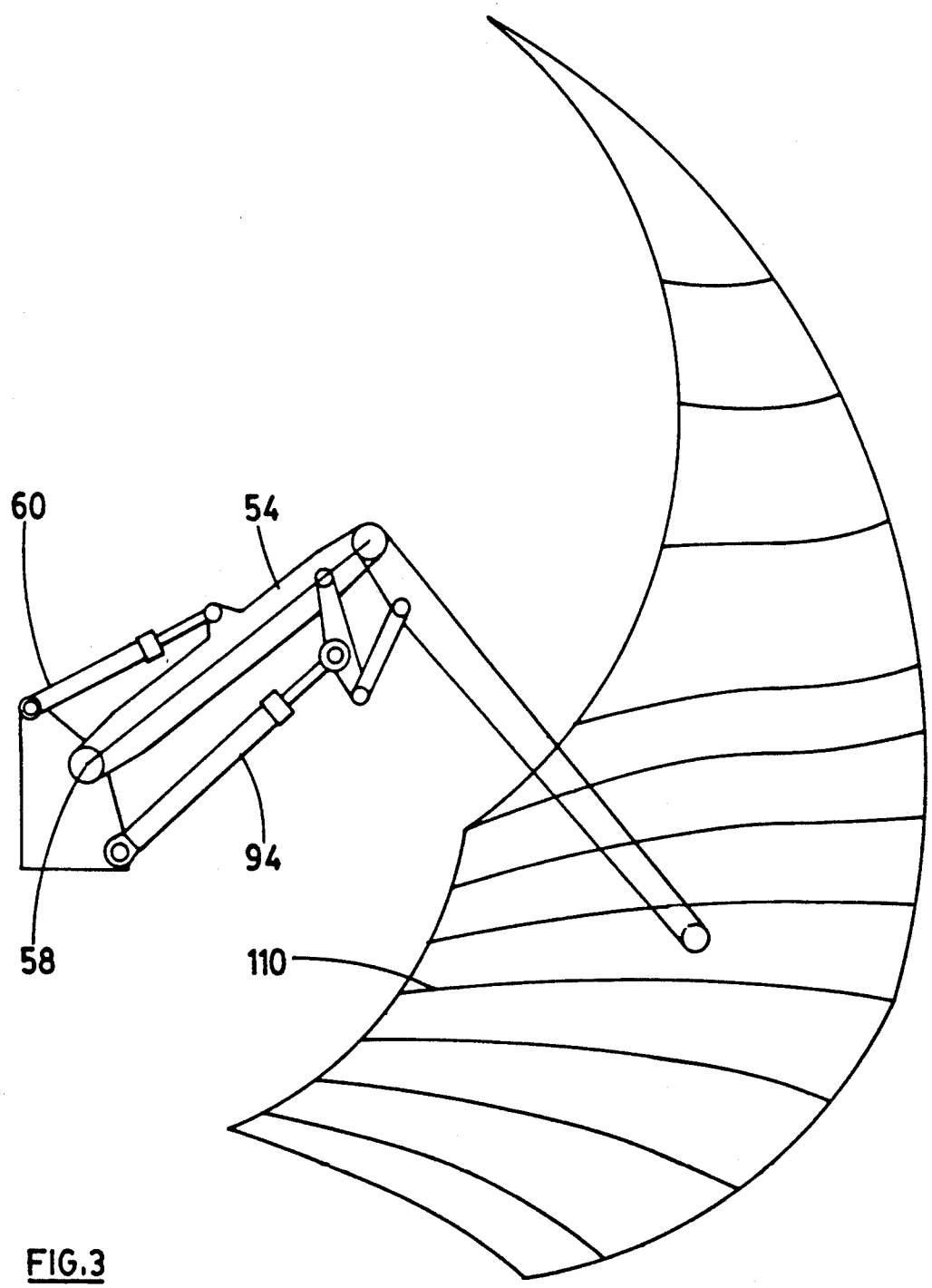
FIG. 3 is similar to FIG. 2 and additionally shows an envelope containing exemplary tree trunk cutting paths.
Figure 4:
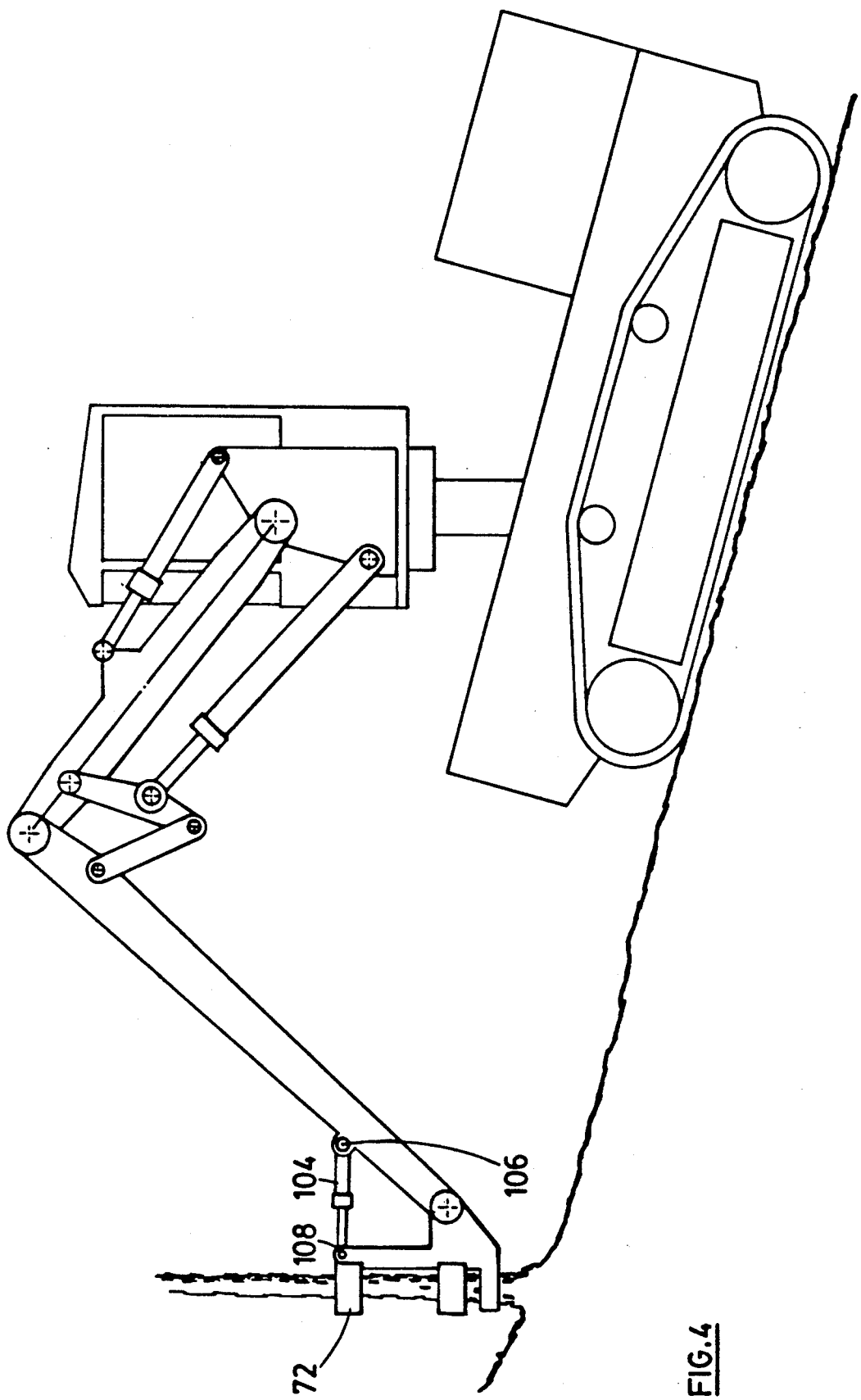
FIG. 4 illustrates a logging vehicle having the preferred feller support in use on a sloped surface.

Turning to FIGS. 2-4, a preferred embodiment support 50 of the present invention is illustrated as part of a mobile feller buncher (shown only in FIG. 4). Carriage base 52 supports boom 54 at pivotal connection 56. An actuator for rotation of boom 54 about pivot axis 58, which is generally horizontal to the ground, is provided by double-acting hydraulic cylinder 60. Cylinder 60 has pivotal connections 62, 64 to the base and boom so that extension of the cylinder causes the boom to rotate downward and its contraction causes upward rotation of the boom. It will be appreciated by those skilled in the art that cylinder 60 may be mounted below boom 54 but it has been found more convenient, for the adaptation of the present invention for use with conventional equipment, to place cylinder 60 above the boom, and connected about half the distance between pivot connections 56, 66. The cylinder is thus located to avoid danger from falling limbs, etc., but at the same time a crowded arrangement of cylinders below boom 54 is avoided.

Boom 68 is connected to boom 54 at pivotal connection 66 having axis of rotation 70 generally parallel to axis 58 of connection 56. Disc saw felling head 72 is mounted at the free end 74 of boom 68.

A knuckle including member links 76, 78 connected at pivotal connection 80 is connected to the booms at pivotal connections 82, 84 the pivotal axes 86, 88, 90 being generally parallel to pivot axis 58. Rotation of boom 68 about axis 70 thus results in the synchronized movement of the links and boom 68. It will be appreciated that the knuckle is located generally below the booms and that the pivot axis 86 of pivotal connection 80 is located below line 92 passing through pivot axes 58, 70.

Cylinder 94 is connected to base 52 and link 76 at pivotal connections 96, 98 rotatable about axes 100, 102.

Disc saw felling head 72 is rotatably connected and its orientation with respect to boom 68 is adjustable through use of cylinder 104 mounted at pivot connections 106, 108.

The height of felling head 72 above the ground is adjusted by operation of cylinder 94. Once the appropriate elevation is obtained, cylinder 94 is generally locked in position. The felling head is moved forward of the carriage by extension of cylinder 60. The particular path described by the felling head depends upon the position of the locked cylinder, but the boom and knuckle arrangement of the preferred embodiment is such that with cylinder 92 locked in position, i.e., acting as rigid stick, the path followed is one suitable for cutting a tree trunk with a disc saw felling head. The operator may thus cut a tree trunk through the operation of the single cylinder 60 once the appropriate felling head elevation has been selected.

An envelope of exemplary tree trunk cutting paths followed by the felling head of the preferred embodiment is illustrated in FIG. 3. It will be appreciated that the nearer to linear a path is, the more ideal it is for cutting a tree trunk. Practically speaking, however, most any of the paths illustrated in FIG. 3 is suitable for cutting a tree trunk with a conventional disc saw felling head well known in the industry, and for example, such as that provided on commercially available feller buncher Model 618 of Koehring Waterous, Brantford, Ontario, Canada. It will further be appreciated that the cutting operation (typically less than twenty-four inches) occurs along only a portion of most of the paths illustrated, for example the path indicated at 110, and that the degree of path curvature during a given cutting operation is thus relatively minor.

Each path illustrated in FIG. 3 is obtained with cylinder 94 locked in particular position. A more elevated cutting path is obtained when cylinder 94 is locked into a more extended position. Since cylinder 94 is locked into position during a particular cutting operation, it is said to act as a stick. It will be appreciated that an operator could adjust cylinder 94 during a cutting operation if some sort of jockeying of the felling head were desired, for example. In this way the disclosed embodiment could optionally be used as a conventional dual cylinder boom support. The course of each path contained in the envelope or family of paths is determined by the arrangement of the booms, knuckle and cylinder 94. The upper and lower limits of the envelope are determined by the degree to which boom 54 may rotate about pivot axis 58, this being limited in the preferred embodiment by the length of hoist cylinder 60 and its placement.

The preferred embodiment provides an operating range of inner angles between the booms from at least about 40° to about 160°. Over this angle range, the support moves between its fully contracted and extended positions, shown in phantom in FIG. 2, without each of the pivotal connections of the booms and knuckle 66, 80, 82, 84 axially overlapping with the travel path of a support member to which it is not directly attached.

Alteration of the orientation of base 52 alters the orientation of the envelope of tree trunk cutting paths. The illustrated support may thus be incorporated as part of a tractor, as illustrated in FIG. 4, in which the base is mounted so as to be tiltable and thus amenable to tree trunk cutting operations on a sloped surface.

It will be appreciated that cutting procedures in which only cylinder 60 is operated (i.e. cylinder 94 locked) obtain significant energy savings over procedures in which two cylinders are operated. Operations in which the preferred embodiment includes components of comparable power output to dual boom supports currently in use are thus more less costly to operate, but further advantage may be obtained by substituting smaller components such as the engine, pumps, oil cooler, etc., as appropriate.

The generally simpler cutting procedure involving the operation of only a single cylinder should also reduce operator fatigue and still required, and produce improved operator performance over systems requiring an operator to operate two cylinders during a trunk cutting operation.

What is claimed is:

1. In a tree feller apparatus having a mobile carriage and a disc saw felling head, an articulated support for the head, comprising:

(a) a first boom having a pivotal connection at a first end to the carriage at a horizontal first pivot axis and an actuator connected between the carriage and first boom for rotation thereby of the first boom in either rotational direction about the first pivot axis;

(b) a second boom having a first end with the head mounted thereon, which boom has a pivotal connection at a second of its ends to a second end of the first boom at a second pivot axis parallel to the first pivot axis;

(c) a knuckle including first and second members having a pivotal connection at a third pivot axis, which first member has a pivotal connection to the first boom at a fourth pivot axis and which second member has a pivotal connection to the second boom at a fifth pivot axis such that the third, fourth and fifth pivot axes are parallel to the first pivot axis and with the third pivot axis located below a line passing through the first and second pivot axes, for synchronized movement of the second boom and the knuckle members when the second boom is rotated about the second pivot axis; and (d) a stick having a pivotal connection at a first end to the carriage at a sixth pivot axis parallel to the first pivot axis, below the line passing through the first and second pivot axes, and having a pivotal connection at a second end to the first member of the knuckle at a seventh pivot axis parallel to the first pivot axis, to couple rotation of the second boom about the second pivot axis with the rotation of the first boom about the first pivot axis so as to permit rotation of the first boom downward with synchronized movement of the second boom away from the carriage such that the head move along a tree trunk cutting path.

2. The apparatus of claim 1 wherein the actuator is a first hydraulic cylinder.

3. The apparatus of claim 2 wherein the first hydraulic cylinder has pivotal connections to the carriage and the first boom at eighth and ninth pivot axes respectively, which axes are located above the line passing through the first and second pivot axes and are parallel to the first pivot axis.

4. The apparatus of claim 3 wherein the stick is a second hydraulic cylinder which may be fixed against extension and retraction during rotation of the first boom.

5. The apparatus of claim 4 further comprising a third hydraulic cylinder connected between the second boom and the feller for adjustment of the orientation of the feller with respect to the second boom.

6. The apparatus of claim 1 wherein the pivotal connections between the first and second booms, the first boom and the first member, the second boom and the second member, and the first and second members are arranged such that the support may be moved between a fully retracted position and a fully extended position without said pivotal connections axially overlapping with a boom or member to which it is not directly connected.

7. The apparatus of claim 6 wherein the booms may operate over an inner angle range between the first and second booms of at least 90°.

8. The apparatus of claim 7 wherein the inner angle range is up to 120°.

9. The apparatus of claim 1 wherein the support is mounted on a tiltable base for adjusting orientation of the tree cutting path with respect to the ground.

10. The apparatus of claim 1 wherein the head further comprises bunching means.

11. In a tree felling apparatus having a mobile carriage and a disc felling head, an articulated support for the head, comprising:
(a) a first boom pivotally connected at a first end to the carriage at a horizontal first pivot axis and an actuator connected between the carriage and first boom for rotation thereby of the first boom in either rotational direction about the first pivot axis;
(b) a second boom having a first end with the head mounted thereon, which boom is pivotally connected at a second of its ends to a second end of the first boom at a second pivot axis parallel to the first pivot axis;
(c) a knuckle including first and second members pivotally connected at a third pivot axis, which first member is pivotally connected to the first boom at a fourth pivot axis and which second member is pivotally connected to the second boom at a fifth pivot axis such that the third, fourth and fifth pivot axes are parallel to the first pivot axis and with the third pivot axis located below a line passing through the first and second pivot axes, for synchronized movement of the second boom and the knuckle members when the second boom is rotated about the second pivot axis; and
(d) a stick pivotally connected at a first end to the carriage at a sixth pivot axis parallel to the first pivot axis, below the line passing through the first and second pivot axes, and pivotally connected at a second end to the first member of the knuckle at a seventh pivot axis parallel to the first pivot axis, to couple rotation of the second boom about the second pivot axis with the rotation of the first boom about the first pivot axis so as to permit rotation of the first boom downward with synchronized movement of the second boom away from the carriage such that the head moves along a tree trunk cutting path.

* * * * *